(12) United States Patent
Verfurth et al.

(10) Patent No.: US 8,127,957 B2
(45) Date of Patent: Mar. 6, 2012

(54) SUSPENDED RECEPTACLE FOR AT LEAST ONE PIECE OF DOUGH AND SET CONSISTING OF A PLURALITY OF SUSPENDED RECEPTACLES OF THIS TYPE

(75) Inventors: Heinz Verfurth, Rietberg (DE); Dieter Selker, Rietberg (DE)

(73) Assignee: Neuenkirchener Maschinenfabrik Emil Kemper GmbH, Rietberg (DE)

( * ) Notice: Subject to any disclaimer, the term of this patent is extended or adjusted under 35 U.S.C. 154(b) by 1431 days.

(21) Appl. No.: 11/649,845

(22) Filed: Jan. 5, 2007

(65) Prior Publication Data

US 2008/0095602 A1   Apr. 24, 2008

(30) Foreign Application Priority Data

Oct. 4, 2006   (DE) .................... 20 2006 015 161 U

(51) Int. Cl.
*B65D 21/02* (2006.01)

(52) U.S. Cl. .................. 220/23.88; 220/478; 220/573.4; 220/528

(58) Field of Classification Search ............... 220/573.3, 220/573.4, 573.5, 478, 23.88, 528; 414/788
See application file for complete search history.

(56) References Cited

U.S. PATENT DOCUMENTS

| | | | | |
|---|---|---|---|---|
| 1,382,610 A * | 6/1921 | Streich | .......................... | 198/713 |
| 1,656,890 A * | 1/1928 | Schiff | .......................... | 198/715 |
| 1,712,211 A * | 5/1929 | Hanson et al. | ................ | 198/714 |
| 2,091,066 A * | 8/1937 | Cohen | .......................... | 220/23.6 |
| 2,104,431 A * | 1/1938 | Marasso | ....................... | 198/713 |
| 2,640,583 A * | 6/1953 | Rechtin et al. | ................ | 198/715 |
| 2,755,913 A * | 7/1956 | Marasso | ....................... | 198/715 |
| 2,919,824 A * | 1/1960 | Roth | ............................. | 414/419 |
| 3,010,413 A * | 11/1961 | Benedict | .......................... | 7/111 |
| 3,146,730 A * | 9/1964 | White | ............................. | 426/27 |
| 3,807,057 A * | 4/1974 | Noel | ............................... | 34/237 |
| 4,185,125 A * | 1/1980 | Sakakibara et al. | .......... | 426/439 |
| 4,186,217 A * | 1/1980 | Tchack | .......................... | 426/523 |
| 4,334,665 A * | 6/1982 | Noel | ............................. | 249/134 |
| 4,398,880 A * | 8/1983 | Seiling | .......................... | 425/439 |
| D271,177 S * | 11/1983 | Lucido | .......................... | D7/387 |
| 4,560,139 A * | 12/1985 | Dahlke | .......................... | 249/112 |
| 4,565,277 A * | 1/1986 | Benier | ..................... | 198/370.05 |
| 5,435,430 A * | 7/1995 | Steiner et al. | ............ | 198/370.05 |
| 5,575,937 A * | 11/1996 | Haase | ............................. | 249/119 |
| 5,678,705 A * | 10/1997 | Tolbanos | ................... | 211/126.1 |
| 5,692,434 A * | 12/1997 | Vrouwenvelder | .............. | 99/477 |
| 6,010,016 A * | 1/2000 | Siegal | ........................ | 211/126.1 |
| 6,068,437 A * | 5/2000 | Boje et al. | ................ | 414/331.02 |
| 6,279,771 B1 * | 8/2001 | Bryant | ....................... | 220/573.1 |
| 2002/0100372 A1* | 8/2002 | Bryant et al. | .................. | 99/422 |
| 2004/0195749 A1* | 10/2004 | Bryant et al. | ................. | 269/100 |

\* cited by examiner

*Primary Examiner* — Anthony Stashick
*Assistant Examiner* — Christopher McKinley
(74) *Attorney, Agent, or Firm* — Browdy and Neimark, PLLC

(57) ABSTRACT

A suspended receptacle for at least one piece of dough has a base comprising two lateral retaining pins with which the base can be connected, so as to pivot about a pivot axis, to a conveyor element conveying a plurality of suspended receptacles of this type. A dough support element of the suspended receptacle has a support for the piece of dough. The dough support element is configured as an exchangeable insert which is detachably connected to the base.

16 Claims, 6 Drawing Sheets

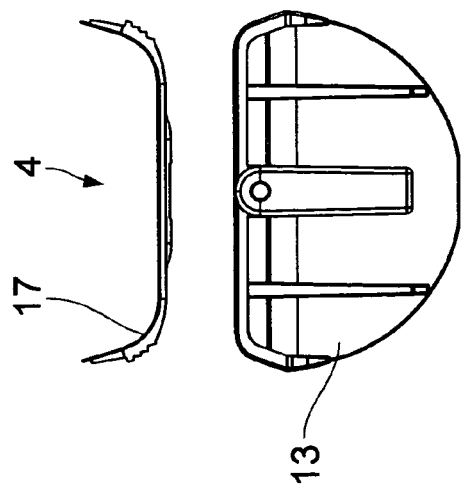
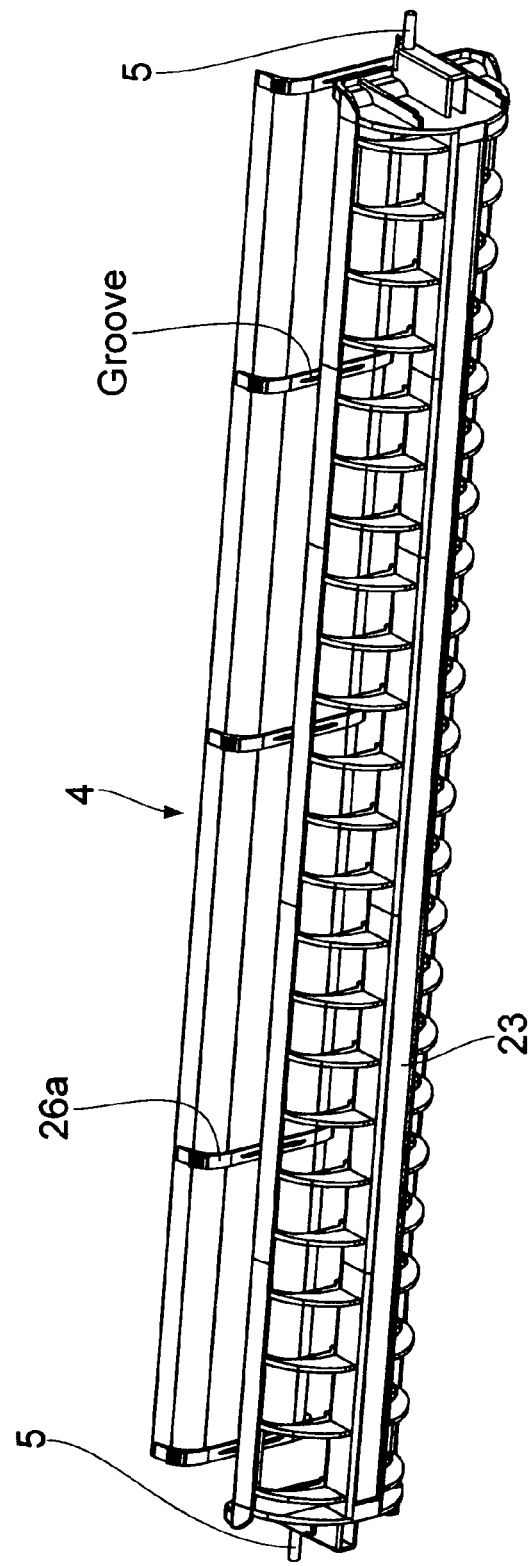

SUSPENDED RECEPTACLE FOR AT LEAST ONE PIECE OF DOUGH AND SET CONSISTING OF A PLURALITY OF SUSPENDED RECEPTACLES OF THIS TYPE

BACKGROUND OF THE INVENTION

1. Field of the Invention

The invention relates to a suspended receptacle for at least one piece of dough and to a set consisting of a plurality of suspended receptacles of this type.

2. Background Art

Suspended receptacles for at least one piece of dough, comprising a base having two lateral retaining pins with which the base can be connected, so as to pivot about a pivot axis, to a conveyer element conveying a plurality of suspended receptacles of this type, comprising a dough support element having a support for the piece of dough, have become known through prior public use. For various uses of the suspended receptacles, these supports consist of different materials. The suspended receptacles are complex to clean and expensive to replace.

SUMMARY OF THE INVENTION

It is therefore an object of the present invention to develop a suspended receptacle of the type mentioned at the outset such that cleaning thereof is simplified and also to reduce the operating costs of a dough processing system using a large number of suspended receptacles of this type.

According to the invention, this object is achieved by a suspended receptacle comprising a base having two lateral retaining pins with which the base can be connected, so as to pivot about a pivot axis, to a conveyor element conveying a plurality of suspended receptacles of this type, comprising a dough support element having a support for the piece of dough, wherein the dough support element is configured as an exchangeable insert which is detachably connected to the base.

The invention recognised that if the dough support element is provided on the suspended receptacle in an exchangeable manner, not only can the support be optimally adapted to the respective intended use of the suspended receptacle, but rather it is at the same time also possible to clean the dough support element independently of the base. This increases the utility of the suspended receptacle considerably.

The locking connection of the dough support element to the base which has at least one locking means by which the dough support element is locked to the base, allows the dough support element to be easily detached from the base. The locking connection is able to impart additional stability to the dough support element. This is particularly advantageous in the case of non-self-supporting supports.

A configuration of the locking means having at least one undercut element, which is connected to the support and reaches behind at least one base locking strip, is simple in its construction. A plurality of undercut elements distributed along the dough support element ensure stable connection of the dough support element to the base even if said dough support element is not made from self-supporting materials.

A configuration of the undercut element being configured as a rib extending in the shape of an arc within a plane perpendicular to the pivot axis and below the support of the dough support element and reaches behind two base locking strips extending at a distance from each other and parallel to the pivot axis, imparts additional stability to the dough support element. The undercut element then simultaneously defines a shape of the dough support element, at least in certain regions.

A configuration of the undercut element being formed onto the support of the dough support element via injection moulding, is particularly cost-effective.

Support ribs between the retailing pins of the base being set apart from one another and on which the dough support element is placed, ensure sufficient stability for the suspended receptacle even if the base is light in its construction.

A division of the base or the dough support element between the retaining pins into a plurality of at least one of base partial elements and of dough support element parts, allows the base and/or the dough support element to be adapted, especially in its width, to various standard sizes of conveyor elements of a dough processing system in which the suspended receptacles are intended to be used.

The base partial elements may be pushed onto a common retaining rail. Such a rail leads to a particularly simple and inexpensive connection of the base partial elements.

In the case of a set consisting of a plurality of suspended receptacles according to the invention, comprising the same type of base and at least two different types of dough support elements, wherein a first dough support element comprises a support made from a first material which is easy to clean and a second dough support element comprises a support made from a second material having good dough removal properties, dough support elements can easily be mutually exchanged, thus allowing dough support elements in need of cleaning to be replaced with cleaned or new dough support elements. Worn replacement elements can also be exchanged. It is also possible to equip a group of bases with different supports so that said members can be used in various components of a dough processing system, for example in a pre-rise compartment, in a final-rise compartment or in a cooling compartment. The first material can, in particular, be gauze. This material is particularly suitable for use in a pre-rise compartment owing to the ease with which it can be cleaned. The second material is, in particular, cotton. This material is particularly suitable for use in a final-rise compartment owing to the ease with which it can be removed, as far as overlying pieces of dough are concerned.

A third dough support element having a perforated support made from a plastics material, is particularly suitable for use in a cooling compartment.

Embodiments of the invention will be described in greater detail hereinafter with reference to the drawings.

BRIEF DESCRIPTION OF THE DRAWINGS

FIG. 3 shows a front view of the dough support element and the base according to FIG. 2;

FIG. 4 shows a perspective view, obliquely from below, of the suspended receptacle according to FIGS. 2 and 3;

DESCRIPTION OF THE PREFERRED EMBODIMENTS

Figure 1:
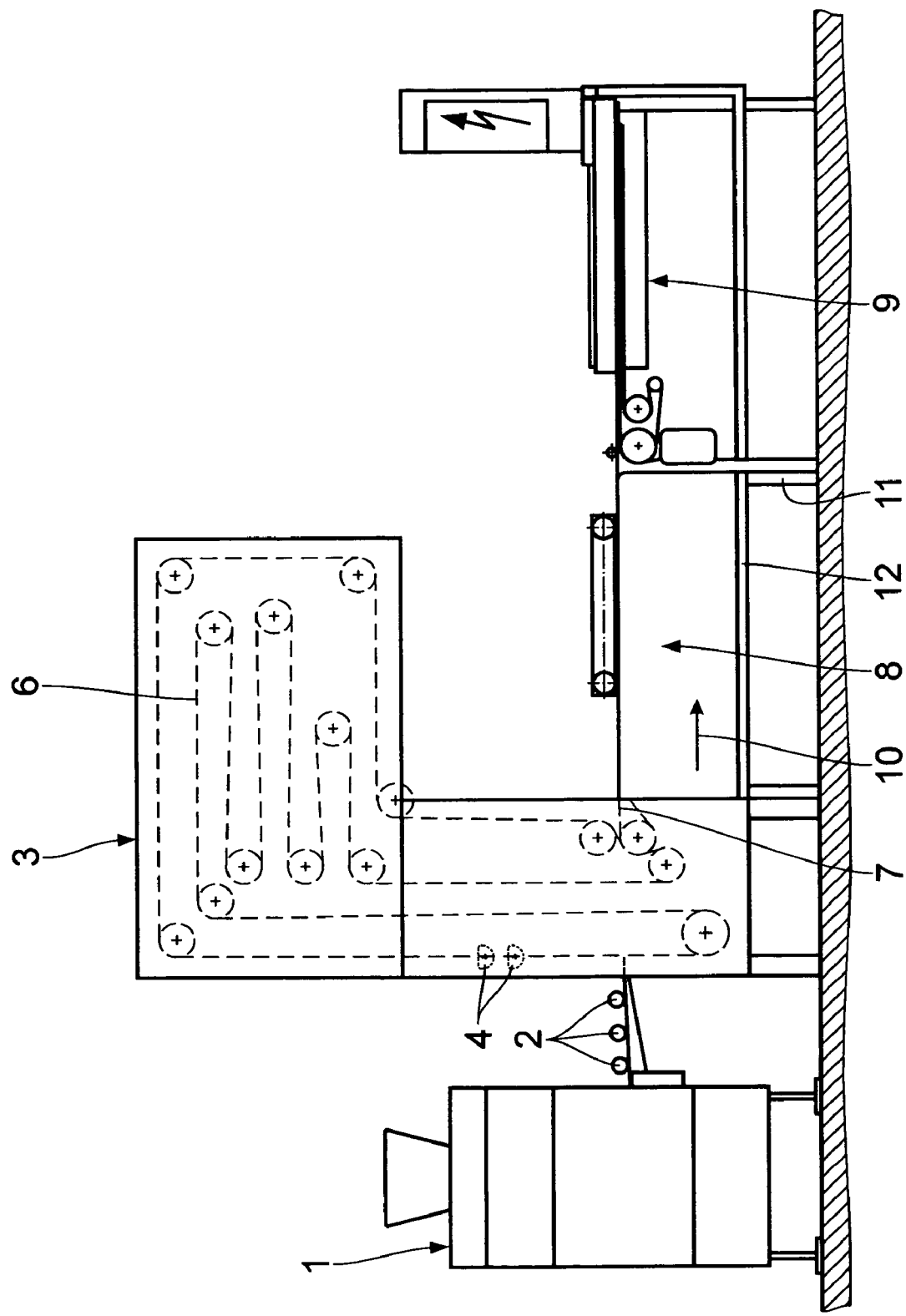
FIG. 1 shows a schematic view of a dough processing system comprising a rise compartment with a plurality of suspended receptacles for pieces of dough.
Figure 2:
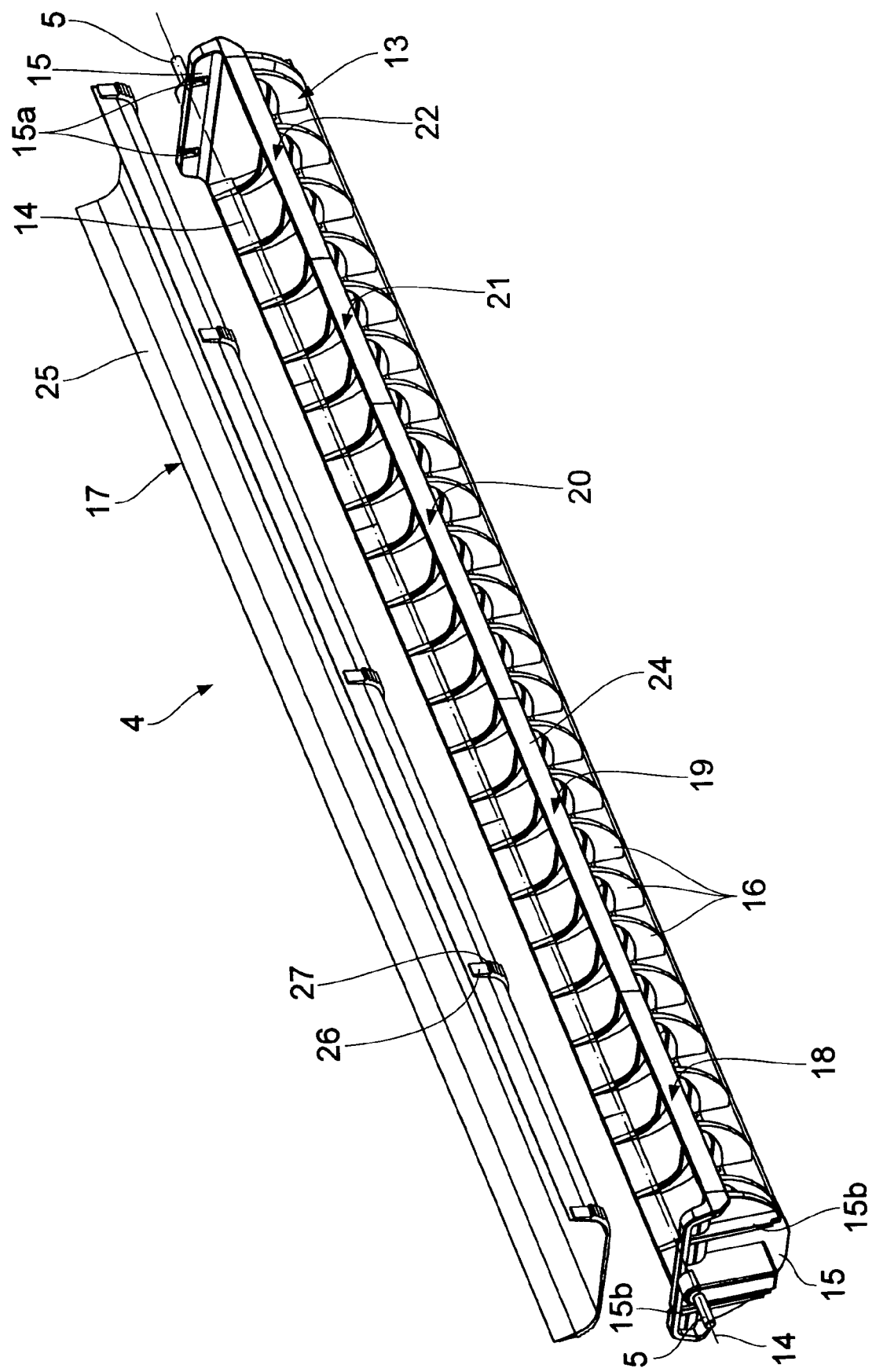
FIG. 2 shows a markedly enlarged perspective view of a suspended receptacle, a dough support element being shown in the detached position above a base.

A roller baking system, shown in FIG. 1 as an example of a dough processing system, has a dough-dividing and rounding machine 1 in which pieces of dough 2 are divided up and rounded in a known manner. After rounding, the pieces of dough 2 are fed to a rise compartment 3 in which they are received in suspended receptacles 4, two of which are shown by way of example in FIG. 1. FIG. 2 to 4 are detailed views of the suspended receptacles 4 in the rise compartment 3. The suspended receptacles 4 are referred to as "trays".

The suspended receptacles 4, which will be described hereinafter in greater detail, are suspended via two lateral retaining pins 5 in the fashion of gondolas, from continuous conveyor means 6, for example chains, about which the suspended receptacles 4 comprising the pieces of dough 2 revolve, the pieces of dough 2 being subjected to a rising process. A delivery belt 7 of the rise compartment 3 forwards the pieces of dough 2 to a longitudinal roller 8 from which they then reach a discarding device 9. The pieces of dough are conveyed along a conveying direction 10 running from left to right in FIG. 1. The rise compartment 3, the longitudinal roller 8 and the discarding device 9 rest on the ground via support feet 11 mounted on a machine room 12. This basic construction of a roller baking system is conventional and known except for the construction of the suspended receptacles 4, which is shown in detail in FIG. 2 to 4 for the rise compartment configuration of the suspended receptacle 4.

The retaining pins 5 are formed integrally with a base 13 of the suspended receptacle 4. The base 13 is made from plastics material. The longitudinal extension of the retaining pins 5 defines a pivot axis 14 of the suspended receptacle 4. The retaining pins 5 are formed integrally with end-face closure walls 15 of the suspended receptacle 4. The mutually facing insides of the closure walls 15 each have two vertically extending blind grooves 15a formed in a complementary manner to lower end portions of vertical webs 15b on the outsides of the closure walls 15. This configuration of the blind ribs 15a and the vertical webs 15b not only allows suspended receptacles 4 stacked one on top of the other or bases 13 stacked on top of one of the other without support elements 17 to be stacked in a defined manner, but also secures them against lateral slippage. Between the two closure walls 15 and parallel thereto, the base 13 has a plurality of support ribs 16 which are set apart from one another and on which a dough support element 17 of the suspended receptacle 4 rests.

In the embodiment according to FIG. 2, the base 13 is divided into, in total, five base partial elements 18, 19, 20, 21, 22, the reference numerals of which are serially numbered from left to right in FIG. 2. The base partial elements 18 to 22 have various standard lengths with which suspended receptacles 4 of differing widths can be combined for different embodiments of rise compartments 3. The base partial elements 18 to 22 are pushed onto a common bottom-side square retaining rail 23, the length of which corresponds to the width of the suspended receptacle 4 between the closure walls 15.

A respective locking strip 24 is formed integrally with the ends, on both sides, of the support ribs 16. The two locking strips 24 extend parallel to the retaining rail 23. Each base partial element 18 to 22 has a locking strip part associated therewith. Adjacent locking strip parts, like the sliding receptacles of the base partial elements 18 to 22 for the retaining rail 23, abut one another.

In the configuration of the rise tank shown in FIG. 2 to 4, the support 25 of the dough support element 17 is in the form of a cloth. The particular material from which the support 25 is made will depend on the configuration of the rise compartment of the dough processing system. If, as in the case of the dough processing system shown in FIG. 1, there is provided a single rise compartment 3, through which all of the suspended receptacles 4 pass by way of a single conveyor means 6, the support 25 is made from cotton. This material allows a piece of dough which has completely risen to be removed easily from the support 25. If, on the other hand, there is provided instead of a single rise compartment both a pre-rise compartment and a post-rise compartment or if a single rise compartment is divided into a pre-rise region and a final-rise region through which an individual conveyor means comprising suspended receptacles 4 in each case passes, the support materials used for the suspended receptacles during the pre-rising process may differ from those used from the suspended receptacles 4 for the final-rising process. In this case, the support 25 for the suspended receptacle 4 for the pre-rising process is made from gauze, which does not absorb moisture and therefore does not tend to form spores. In addition, this material is easy to clean. The suspended receptacles 4 for the final-rising process have, again, cotton supports 25 from which pieces of dough 2 which have completely risen can easily be removed.

The dough support element 17 is connected to the base 3 via a locking means. The support-side locking element is formed by a plurality of undercut elements 26 connected to the support 25. Said undercut elements are in the form of ribs extending in the shape of an arc within planes which are set apart from one another and extend perpendicularly to the pivot axis 14. The undercut elements 26 are sprayed onto the support 25 by injection-moulding. Each undercut element 26 has two locking steps 27, each of the two locking steps 27 being associated with one of the two locking strips 24 and reaching behind said locking strip in the engaged state. The locking strips 24 are therefore the counter-locking member for the locking means connecting the support 25 to the base 13. The undersides of the undercut elements 26 each contain a longitudinal groove (cf. FIG. 4) formed in a complementary manner to the upper closure of the support ribs 16 facing the undercut elements. The dough support element 17 is thus positioned in a defined manner with respect to the base 13.

Figure 5:
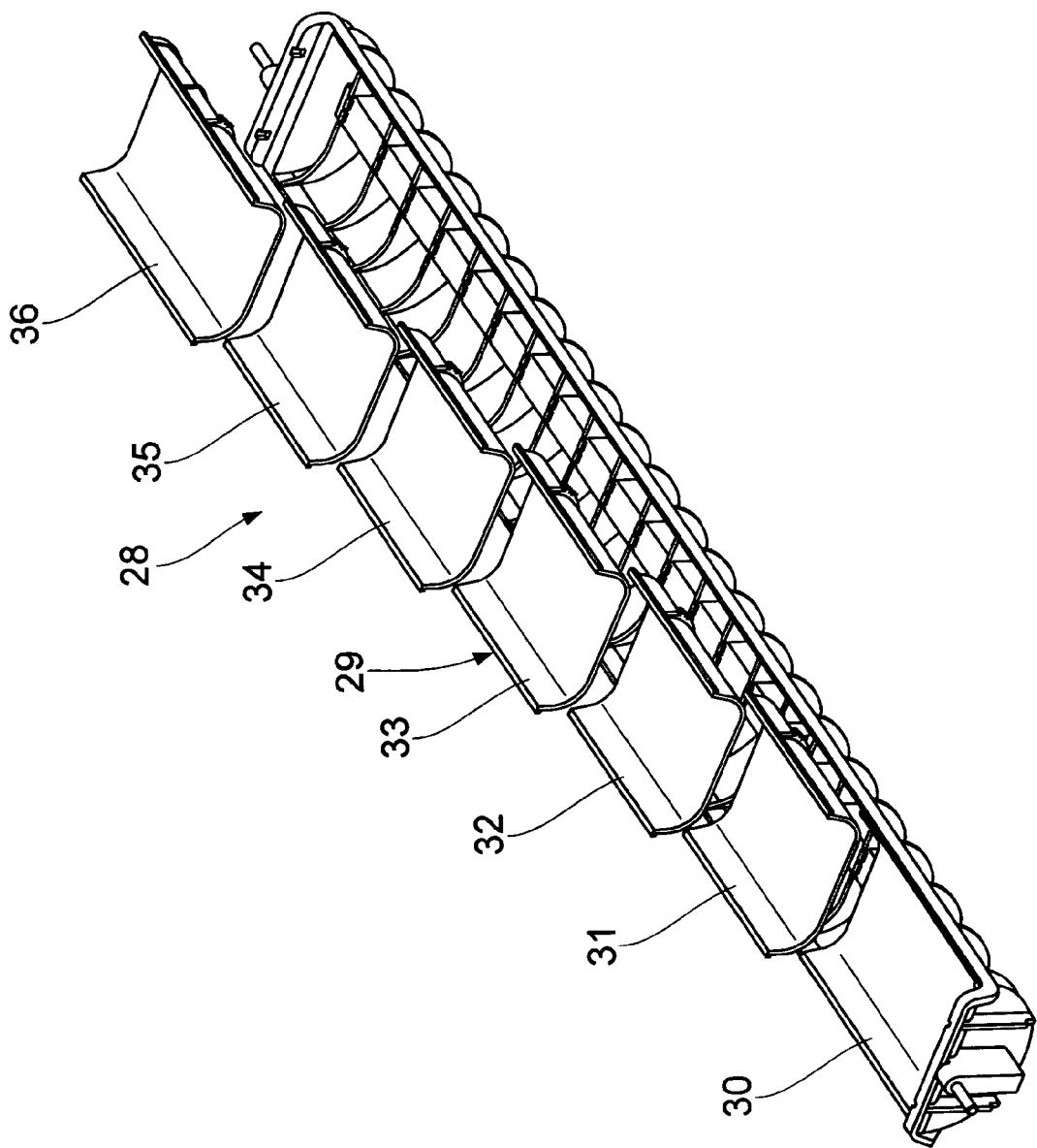
FIG. 5 shows a perspective view of a further variation of a suspended receptacle, a plurality of dough support element parts being shown at varying distances from the base.
Figure 6:
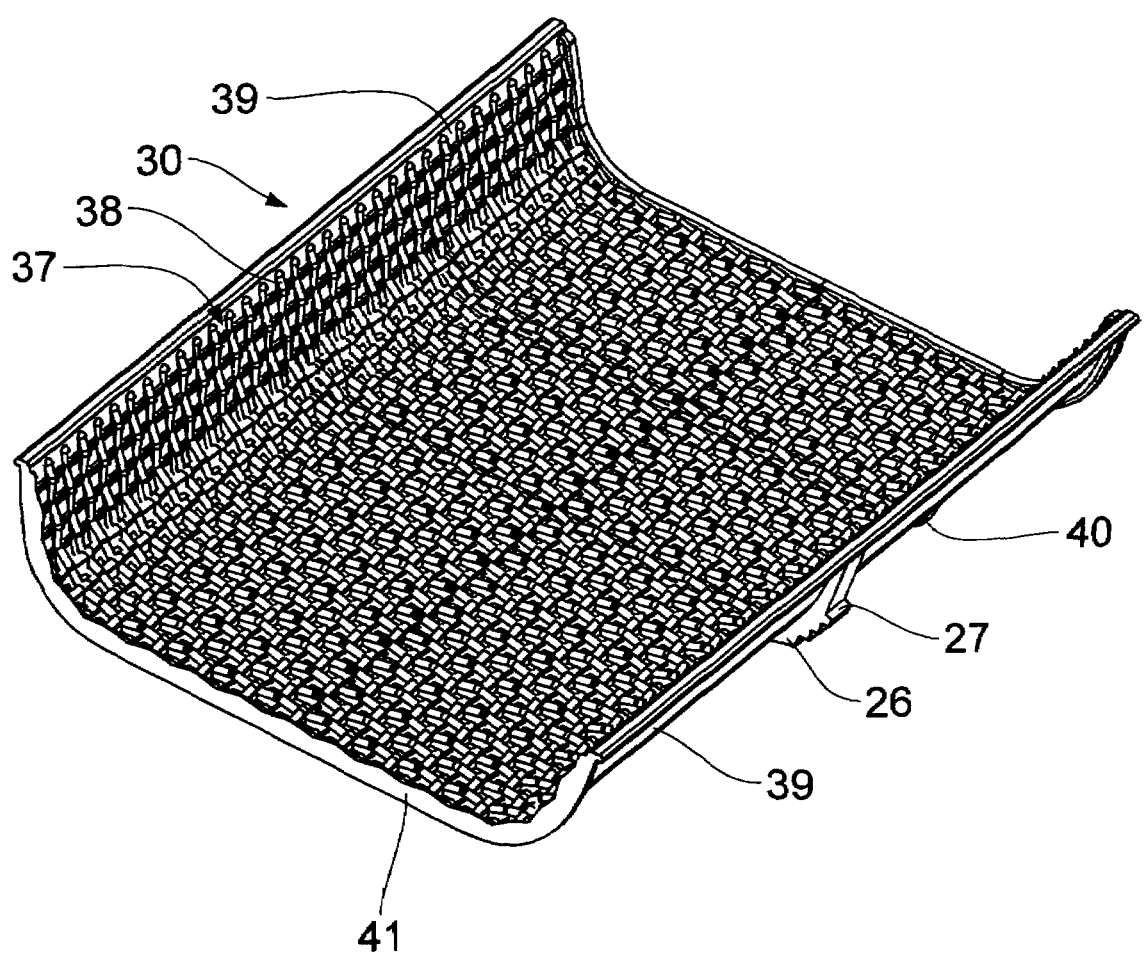
FIGS. 6 and 7 show enlarged views of one of the dough support element parts of the embodiment according to FIG. 5.
Figure 7:
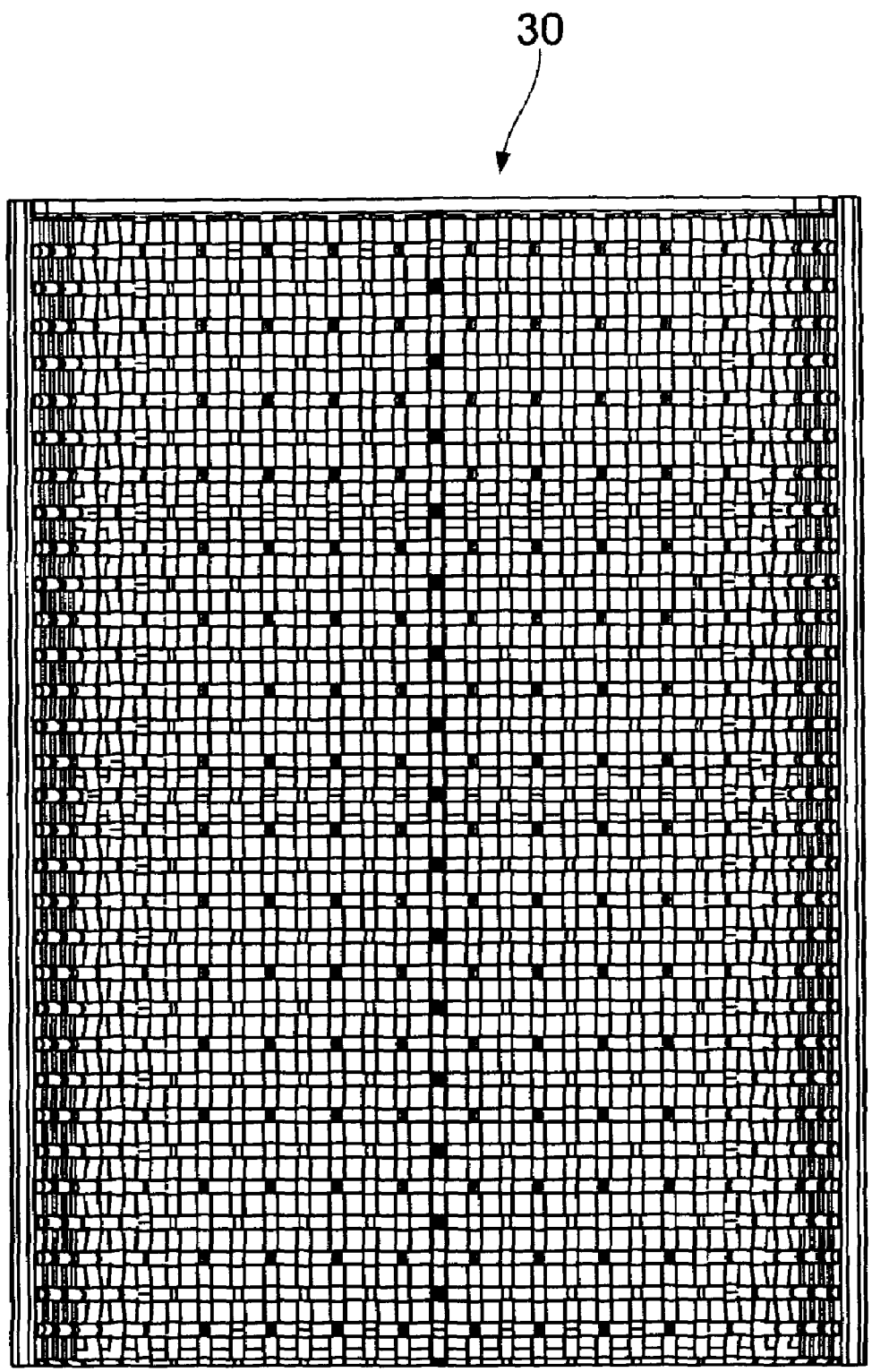

FIG. 5 to 7 show a further variation of a suspended receptacle 28. Components corresponding to those described herein before with reference to FIG. 1 to 4 are denoted by the same reference numerals and will not be redescribed in detail.

The suspended receptacle 28 according to FIGS. 5 and 6 is suitable for use in cooling compartments for pieces of dough 2.

The suspended receptacle 28 differs from the suspended receptacle 4 merely in terms of the configuration of a dough support element 29. Said dough support element is divided into a plurality of dough support element parts 30, 31, 32, 33, 34, 35, 36 which, like the base part elements 18 to 22, are configured in various standard lengths. All of the dough support element parts 30 to 36 are sprayed from plastics material. The support 37 of each dough support element 30 to 36 is in the form of a net-like plastics material grating structure 38 which, on the edge side, i.e. adjacent to the locking strips 24 of the base 13, is integrally connected to reinforcement strips 39. Below the support 37, connected integrally to the plastics material grating structure 38 and, at the end side, to the reinforcement strips 39, is the undercut element 26 comprising the locking steps 27. In addition, a dough support element part, as shown in the example of the dough support element 30, can also have reinforcement arcs 40 which are similar in shape to the undercut elements 26 but do not have any locking steps 27. At the end face, further reinforcement arcs 41 follow the arcuate course of the plastics material grating structure 38.

In order to ensure that the dough processing system is operated with minimum downtime, there is provided with the dough processing system a set of suspended receptacles 4 comprising various types of supports 25, 37 which are respectively suitable for pre-rising, for final rising and for use in a cooling compartment. A single type of base 13 can be used for all of these suspended receptacles 4, 28. A greater number of supports 25, 37 than bases 13 can therefore, in particular, be provided. If a support 25, 37 has to be cleaned or else becomes worn, the locking connection between the support 25, 37 and the base 13 is simply cancelled manually and the support 25, 37 is exchanged for a cleaned or new support 25, 37. It is also possible to interchange various types of support. In this way, once the supports have been exchanged, operation of the dough processing system can certainly be continued after a brief downtime. The base partial elements 18 to 22 and the dough support element parts 30 to 36 can be provided as individual elements in the fashion of a modular system, so suspended receptacles 4, 28 with differing widths between the retaining pins 5 can be combined for various types of dough processing systems.

What is claimed is:

1. Suspended receptacle (4; 28) for at least one piece of dough (2), comprising a base (13) having two lateral retaining pins (5) with which the base (13) can be connected, so as to pivot about a pivot axis (14), to a conveyor element (6) conveying a plurality of suspended receptacles (4; 28) of this type, comprising a dough support element (17; 29) having a support (25; 37) comprising an inner surface for the piece of dough (2) to be placed thereon and said support (25; 37) further comprising an outer surface opposite to the inner surface, wherein the dough support element (17; 29) is configured as an exchangeable insert which is detachably connected to the base (13), wherein said suspended receptacle (4; 28) further comprises at least one locking means (26; 24) by which the dough support element (17; 29) is locked to the base (13), wherein the locking means (26: 24) has at least one undercut element (26) which is connected to the support (25; 37) and reaches behind at least one base locking strip (24), and wherein the undercut element (26) is configured as a rib extending in the shape of an arc, thereby defining an extension plane, the extension plane being perpendicular to the pivot axis (14), wherein the rib extends from an area adjacent a first longitudinal side of the outer surface to an area adjacent a second longitudinal side of the outer surface of the support (25; 37) of the dough support element (17; 29) reaching behind two base locking strips (24), such that locking and unlocking of said locking means (26; 24) is enabled in the plane perpendicular to the pivot axis (14), said two base locking strips (24) extending at a distance from each other and parallel to the pivot axis (14).

2. Suspended receptacle according to claim 1, wherein the undercut element (26) is formed onto the support (25; 37) of the dough support element (17; 29) via injection moulding.

3. Suspended receptacle according to claim 1, wherein the base (13) has, between the retaining pins (5), a plurality of support ribs (16) which are set apart from one another and on which the dough support element (17; 29) is placed.

4. Suspended receptacle according to claim 1, wherein at least one of the base (13) and the dough support element (17; 29) is divided, between the retaining pins (5), into a plurality of at least one of base partial elements (18 to 22) and of dough support element parts (30 to 36).

5. Suspended receptacle according to claim 4, wherein the base (13) is divided, between the retaining pins (5), into a plurality of base partial elements (18 to 22), and wherein the base partial elements (18 to 22) are pushed onto a common retaining rail (23).

6. Set consisting of a plurality of suspended receptacles (4; 28) according to claim 1, comprising the same type of base (13) and at least two different types of dough support elements (17; 29), wherein a first dough support element (17) comprises a support made from a first material which is easy to clean and a second dough support element (17) comprises a support made from a second material having good dough removal properties.

7. Set according to claim 6, wherein a third dough support element (29) has a perforated support (37) made from a plastics material.

8. A suspended receptacle (4; 28) for at least one piece of dough (2), comprising:
a base (13) having two lateral retaining pins (5) with which the base (13) can be connected, so as to pivot about a pivot axis (14), to a conveyor element (6) conveying a plurality of suspended receptacles (4; 28) of this type,
a dough support element (17; 29) having a support (25; 37) comprising an inner surface for the piece of dough (2) to be placed thereon and said support (25; 37) further comprising an outer surface opposite to the inner surface, the dough support element (17; 29) being configured as an exchangeable insert which is detachably connected to the base (13),
at least one undercut rib-shaped element (26) connected to the support (25; 37) on an underside of the dough support element (17; 29) to lock the dough support element (17; 29) to the base (13), and extending in the shape of an arc, thereby defining an extension plane, the extension plane being perpendicular to the pivot axis (14), wherein the rib extends from an area adjacent a first longitudinal side of the outer surface to an area adjacent a second longitudinal side of the outer surface of the support (25; 37) of the dough support element (17; 29), said at least one undercut rib-shaped element (26) comprising locking steps, and
two base locking strips (24) extending at a distance from each other and parallel to the pivot axis (14), each of the base locking strips extending along an opposite longitudinal side of the base from one another, and configured to engage the locking steps on each of the at least one undercut rib-shaped element (26), such that locking and unlocking of said locking means (26; 24) is enabled in the plane perpendicular to the pivot axis (14).

9. The suspended receptacle according to claim 8, wherein the undercut element (26) is formed in one piece with the support (25; 37) of the dough support element (17; 29) via injection moulding.

10. The suspended receptacle according to claim 8, wherein the base (13) comprises a plurality of support ribs (16) between the retaining pins (5), which are set apart from one another and on which the dough support element (17; 29) is placed.

11. The suspended receptacle according to claim 8, wherein at least one of the base (13) and the dough support element (17; 29) is divided, between the retaining pins (5), into a plurality of at least one of base partial elements (18 to 22) and of dough support element parts (30 to 36).

12. The suspended receptacle according to claim 11, wherein the base (13) is divided, between the retaining pins (5), into a plurality of base partial elements (18 to 22), and wherein the base partial elements (18 to 22) are pushed onto a common retaining rail (23).

13. A set consisting of a plurality of suspended receptacles (4; 28) according to claim 8, comprising the same type of base (13) and at least two different types of dough support elements (17; 29), wherein a first dough support element (17) comprises a support made from a first material which is easy to clean and a second dough support element (17) comprises a support made from a second material having good dough removal properties.

14. The set according to claim 13, wherein a third dough support element (29) has a perforated support (37) made from a plastics material.

15. The set according to claim 1, wherein the at least one undercut element extends in a direction perpendicular to the pivot axis (14) across the width of the support.

16. The set according to claim 13, wherein the at least one undercut element extends in a direction perpendicular to the pivot axis (14) across the width of the support.

* * * * *